United States Patent [19]

Deguchi et al.

[11] 4,297,187
[45] Oct. 27, 1981

[54] SURFACE TREATMENT OF PLASTIC MATERIAL

[75] Inventors: Yukichi Deguchi; Hideki Yamagishi; Shunichiro Kirimura, all of Tokyo, Japan

[73] Assignee: Toray Industries, Inc., Tokyo, Japan

[21] Appl. No.: 82,271

[22] Filed: Oct. 5, 1979
(Under 37 CFR 1.47)

[30] Foreign Application Priority Data

Oct. 5, 1978 [JP] Japan .................. 53-123013

[51] Int. Cl.$^3$ .............................................. C08F 2/52
[52] U.S. Cl. .................. 204/165; 204/168
[58] Field of Search .................. 204/165, 168, 169

[56] References Cited

U.S. PATENT DOCUMENTS

| | | | |
|---|---|---|---|
| 3,284,331 | 11/1966 | McBride et al. | 204/165 |
| 3,676,181 | 7/1972 | Kowalewski | 204/168 X |
| 3,914,521 | 10/1975 | Beatty et al. | 428/461 |
| 3,992,495 | 11/1976 | Sano et al. | 264/22 |
| 4,153,560 | 5/1979 | Dinter et al. | 250/531 |

*Primary Examiner*—F. Edmundson
*Attorney, Agent, or Firm*—Austin R. Miller

[57] ABSTRACT

Plastic surfaces are treated with electrical corona discharge in an atmosphere of nitrogen and carbon dioxide. Oxygen is substantially excluded, and is kept at less than 0.1% by volume.

8 Claims, 1 Drawing Figure

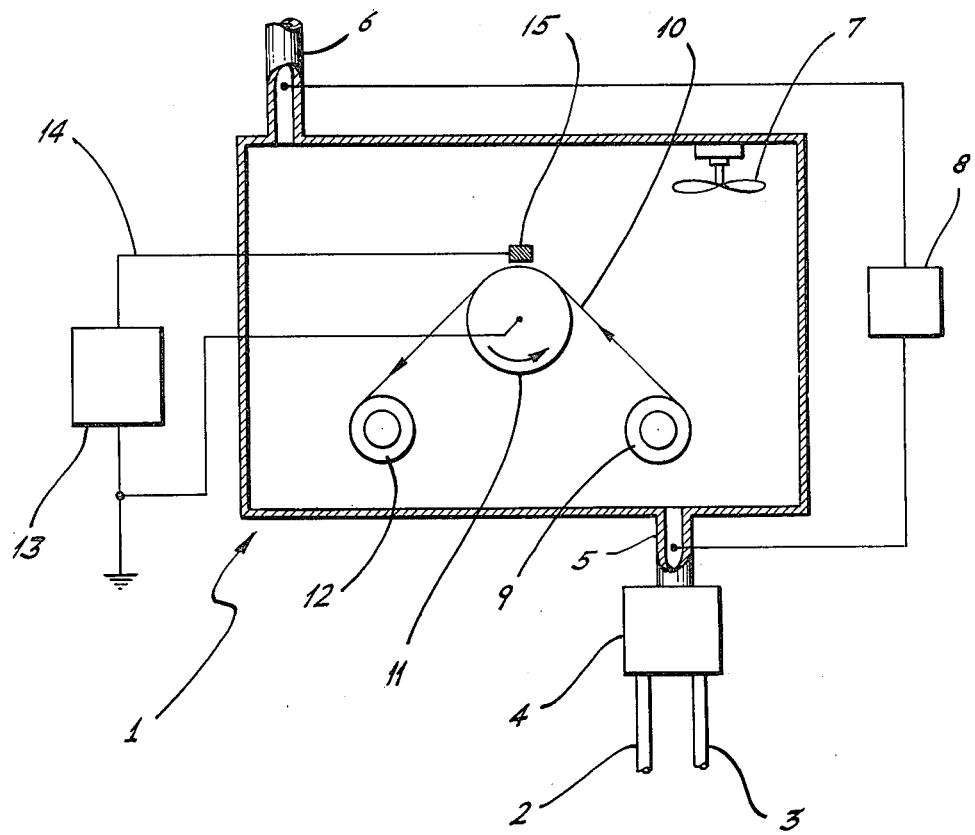

SURFACE TREATMENT OF PLASTIC MATERIAL

This invention relates to a process for surface treatment of formed plastics, especially plastic films.

In many applications, plastic films are subjected to processing such as coating, printing, metallizing and lamination before usage. But, most plastics have such poor adhesiveness that treatment in order to improve adhesiveness is indispensable. For instance, it is desirable that plastic film for packaging use can be printed with cellulose nitrate-type printing inks (so-called inks for cellophane) which have the advantages of high-speed and residual solvent-free printing. Most plastic films, however, have insufficient adhesiveness for this type of ink.

Accordingly, many kinds of techniques, such as discharge treatment, chemical treatment and flame treatment, are proposed to improve the adhesiveness of the plastics by activating their surfaces. Above all, it is known that corona treatment in a substantially oxygen-free nitrogenous atmosphere (hereinafter referred to as "NCD treatment") gives excellent improvement in adhesiveness, and the process is simple and highly efficient. This NCD treatment has special efficiency in improving the adhesiveness for cellulose nitrate-type binders, and most polypropylene or polyester films subjected to NCD treatment can be printed upon by using ink suitable for cellophane. From this point of view, NCD treatment is a very effective and efficient surface treatment process.

NCD treatment, however, is limited in application because of certain defects. For example, the surfaces of plastics treated by the NCD process tends to become charged up by friction with a metal which is electrically grounded. And for this reason, these surfaces have extraordinarily high apparent friction coefficients with the metal surface electrically grounded.

This property causes a tendency to form wrinkles or scratches owing to poor slippage between the film and the metallic guide rolls in film production or processing lines, and also causes a "feeding problem" by reason of friction between the film and the metallic parts, such as in the case of automatic packaging machines.

Although these difficulties are partly remedied by addition of antistatic agents to the plastics, there are certain kinds of plastics which have no satisfactory antistatic agents and as to some, the adhesiveness of the plastic surfaces is interfered with by percolation of inadequate antistatic agents. Especially, when using such plastics in metallic vapor deposition processes, addition of antistatic agents results in a crucial adhesion problem.

An object of this invention is to provide a process for suface treatment of plastics, which process overcomes the disadvantages above mentioned, and provides superior efficiency for improving the adhesiveness in comparison with the NCD treatment.

As a result of intensive studies of characteristics of corona treatment in various gases, we have now found unexpected advantages in corona treatment in an atmosphere of mixed gas having a certain composition which will be described in detail hereinafter.

This invention relates to a process for treating the surfaces of plastics, wherein the plastics are subjected to corona discharge in an atmosphere substantially consisting of nitrogen and carbon dioxide.

Plastics treated by the process of the present invention have surprising advantages in that:

(1) They show very little change in mechanical or optical characteristics of the films themselves because of the ultra-thin surface layer thickness that can be achieved (usually 20 nm or less);
(2) The plastic surfaces show excellent adhesiveness for various kinds of printing inks, including inks for cellophane; and
(3) The plastic surfaces have good slip characteristics while in contact with an electrically grounded metal because charge accumulation does not take place as a result of friction with such metal.

Moreover, it is very surprising that such plastic surfaces have striking characteristics and are so superior to corresponding surfaces resulting from NCD treatment. That is:

(4) They have excellent adhesiveness for vapor-deposited metals; and
(5) They can be printed not only by application of ordinary solvent-type inks, but also by water soluble inks because of their highly hydrophilic surfaces.

There are practically no limitations with respect to the kinds of plastics that may be selected for the process of the present invention. This process shows extremely high efficiency when applied to plastics of a wide range from polyolefins having no polarity to polyamides having strong polarity.

Representative plastics are polyethylene, polypropylene, polyester, polyvinylchloride, polyvinylidene chloride, polyamide, polyimide and fluoroplastics and the like.

Although there is no limit as to the shapes of the plastics used in this process, it is most applicable to sheets or films. In case of application to films, this process is applicable to films having various states of orientation, such as uni-axially oriented film, bi-axially oriented film and the like.

High efficiency can be attained by incorporating this process into the film manufacturing process.

The term "corona discharge treatment" as described in connection with this invention means the surface treating process wherein the object of the treatment is subjected to treatment in an atmosphere having a faint glow adjacent to the surface of an electrical conductor at high voltage, and is achieved by applying high voltage between a pair of electrodes in the gas atmosphere with a pressure of about 100 mg Hg to about 3 atmospheres.

In the case of treatment of film, it is desirable that one of a pair of electrodes be a metallic roll and that the film be treated on the roll guiding the film. In case of thin film, moreover, the surface of this roll electrode should desirably be covered with a dielectric.

On the other hand, any shape such as needle, bar, wire or knife is applicable for use as the other electrode of the pair.

For voltage to be applied between a pair of electrodes, a direct current or an alternating current can be used. It can have any wave pattern. Indeed, an alternating current with any wave form superposed on a direct current can be used. Sinusoidal waves, triangular waves, rectangular waves, saw tooth waves or pulse waves, with wave heights of 2 kV to 30 kV (ground to peak) and frequencies of 50 Hz to 500 kHz are especially desirable from the viewpoint of treatment efficiency.

It is desirable that electrical energy to be supplied to a pair of electrodes be generally in the range of 500 joule to 30,000 joule per 1 $m^2$ of surface area of the object being treated, though the value is dependent on the object and its properties. The lower energy supply below 500 joule results in poor effect of treatment, and the higher one above 30,000 joule results in loss of adhesiveness because of degradation of the surface layer.

"Corona discharge treatment" in accordance with this invention must be carried out in a mixed gas atmosphere consisting essentially of nitrogen ($N_2$) and carbon dioxide ($CO_2$). The mix ratio of $N_2$ to $CO_2$ has to be in the range of 99.5:0.5 to 50:50 by volume. This ratio is preferably in the range of 99.2:0.8 to 80:20 from a viewpoint of treatment efficiency. Too little $CO_2$ results in the aforementioned disadvantages of so-called NCD treatment, and too high a $CO_2$ ratio causes an efficiency drop in the adhesiveness for inks for cellophane, which is an important advantage of this invention.

The oxygen concentration in the treatment atmosphere of this invention must be less than 0.1 vol %. A concentration of less than 0.05 vol % is preferable from a viewpoint of durability of the characteristics applied to the plastic surface by the treatment. A higher oxygen concentration of more than 0.1 vol % results in very little improvement of adhesiveness because the oxygen radicals, which are generated by the corona discharge, react rapidly and preferentially on the surface of the plastics and, as a result, rapid degradation of the surface layer occurs. Small quantities of gases other than oxygen, for instance carbon monoxide or dilution gases such as argon or hydrogen, are permissible to the extent that the beneficial effects of the present invention are not impeded.

One example of an apparatus for practicing the process of this invention is shown in the appended drawing.

The drawing represents a schematic view, in side elevation, of a corona discharge treatment apparatus, with certain parts broken away and shown in section in order to reveal important details.

The chamber 1 in the drawing is designed to prevent intermixing of air into the chamber atmosphere. Nitrogen from the nitrogen inlet 2 and carbon dioxide from the carbon dioxide inlet 3 are measured and mixed at a specific ratio by the mixer 4. The mixture is supplied through a gas inlet 5, and is exhausted through a gas outlet 6. The fan 7 is rotated to mix and unify the composition of the atmosphere within the chamber. The supply of the mixed gas must be sufficient to maintain the remaining oxygen concentration, which is measured by the oxygen analyzer 8, at a value less than 0.1 vol %.

The film 10 is unwound from the roll 9 and is subjected to the treatment of this invention on the treating roll (roll-electrode) 11, and is then wound upon the roll 12. The treating roll 11 is electrically grounded and its surface is covered with dielectric material. The voltage, which is generated and controlled by the generator 13, is applied to the electrode 15 through the high voltage cable 14. Corona discharge is generated in the space gap between electrode 15 and the film surface on the treating roll 11.

The present invention is hereinafter further explained in detail, together with illustrations of selected methods of film evaluation, and with some examples which are not intended to limit the scope of this invention, which is defined in the appended claims.

(1) An evaluation of printability

A printing ink for cellophane ("CC-ST" white, manufactured by Toyo Ink Co.) is printed on the surface of the film by use of metering rods or gravure roll coaters so that a printing layer with a thickness of 3 g/m² is formed. The film thus printed is dried for one minute at 60° C.

A peeling test by use of a cellophane-based adhesive tape ("Cello-Tape", manufactured by Nichiban Co.) is carried out after aging for 24 hours at room temperature and humidity.

In the evaluation, certain rankings were applied as descriptive of the results, and are as follows:

5 None of the printed ink layer was peeled off. Excellent adhesion was obtained.

4 90% and more of the ink layer by area remained. Good adhesion was obtained.

3 75% to 90% of the ink layer by area remained. Fair adhesion was obtained.

2 50% to 75% of the ink layer by area remained. Poor adhesion was obtained.

1 Less than 50% of the ink layer by area remained. Poor adhesion was obtained.

(2) Measurement of the critical surface wetting tension $\gamma_c$

This was measured by the method of JIS K-6768. Three successive standard solutions, which are listed hereinafter, were used. Each corresponded to a degree of the wetting tension as follows:

30 dynes/cm $\leq \gamma_c \leq$ 56: JIS K-6768 standard solution
56 dynes/cm $< \gamma_c \leq$ 72: water solution of ammonia
72 dynes/cm $< \gamma_c \leq$ 86: water solution of sodium hydroxide.

(3) Evaluation of adhesion to vapor deposited aluminum (Metallizability)

Aluminum is vapor-deposited on the surface of the film by using a bell jar type vacuum metallizer (Model EBH-6, manufactured by Nippon Vacuum Technique Co.) at a pressure of about $1 \times 10^{-5}$ mmHg so that a metallic layer having a thickness of about 60 nm is formed.

After that, a peeling test using cellophane-based adhesive tape is carried out. The rankings of this evaluation are the same as already described in (1) above.

(4) Measurement of slipperiness of the film with respect to a grounded metallic surface Dynamic frictional force of the film against an aluminum plate is measured by a slip tester (manufactured by Toyo Tester Ind. Co.).

This dynamic frictional force, in general, is constant during frictional motion. However, when a film readily becomes charged by friction against the metallic surface, such as in NCD treated film, this dynamic frictional force shows an increase with frictional motion. This is because an electrical charge is generated on the film surface by the friction and the film is pressed against the aluminum plate owing to this electrical charge. As a result, "the apparent dynamic coefficient of friction", which is defined as the frictional force divided by the amount of weight, increases.

"Coefficient of friction against metal", $\mu$met, is defined in the following equation:

$$\mu\text{met} = F(150)/W,$$

where F(150) means the frictional force at the point where the aluminum plate of the slip tester is moved through a distance of 150 mm, and W means the amount of static weight.

The conditions of measurement are as follows:
Speed of movement of aluminum plate: 600 mm/min.
Amount of static weight (W): 500 g.

EXAMPLE 1

(1) A film as the object to be treated.

Isotactic polypropylene film ("Torayfan" BO T2500, manufactured by Toray Ind. Inc.) having a thickness of 20 μm, which was formed by the usual tenter method, was prepared.

(2) Surface treatment.

The treatment of this invention was carried out in comparison with an NCD treatment and a corona treatment in air atmosphere (hereinafter referred to as "ACD treatment").

(A) Treatment of the present invention.

| The apparatus was as shown in FIG. 1. | |
| --- | --- |
| Gas composition in the chamber: (Composition of supplied gas) | Nitrogen 90 vol % Carbon dioxide 10 vol % Remaining oxygen 0.01 vol % Relative humidity less than 0.03% RH |
| Space gap between counter electrode and film surface: | 1.0 mm |
| Film running speed: | 100 m/min |
| Generator: | Model HF-401, manufactured by Kasuga Electric Co. (Max. power 4 kW, frequency 110 kHz, sinusoidal wave) |
| Supplied electrical energy: | 3,600 joule/m$^2$ |
| (B) NCD Treatment. This was carried out under the same conditions as (A), except for the different gas composition in the chamber: | |
| Supplied gas: | Pure nitrogen |
| Remaining oxygen content: | 0.01 vol % |
| Relative humidity: | less than 0.03% RH |
| (C) Corona treatment in air atmosphere (ACD Treatment). The conditions were as follows: | |
| Apparatus: | Multiple purpose surface treating apparatus (Model FE-X2 (manufactured by Toray Ind. Inc.) |
| Shape of electrode: | bar |
| Space gap: | 1.0 mm |
| Film running speed: | 100 m/min |
| Generator: | Model HF-301 (manufactured by Kasuga Electric Co.) |
| Supplied electrical energy: | 3,600 joule/m$^2$ |

The evaluation results of the film thus obtained are shown in Table 1.

The ACD treated film was poor both in respect of printability and metallizability.

Although the NCD treated film excelled in printability and metallizability, it was poor with respect to slipperiness with respect to a grounded metal.

On the other hand, the film treated by the process of the present invention excelled in slipperiness with respect to the grounded metal as well as printability and metallizability. This process had none of the defects which NDC treatment had, and moreover, gave extraordinarily high critical surface wetting tension to the film surface.

TABLE 1

| Symbol of the film | Treatment | Printability | Metallizability | Critical surface wetting tension (dyne/cm) | Coefficient of friction against metal μ met |
| --- | --- | --- | --- | --- | --- |
| A-1 | Process of this invention | 5 | 5 | 70 | 0.52 |
| B | NCD Treatment | 5 | 4 | 48 | 3.1 |
| C | ACD Treatment | 1 | 3 | 41 | 0.54 |

EXAMPLE 2

(1) The film: the same polypropylene film as in Example 1 was used.

(2) Surface treatment.

Treatments of this invention were carried out in the atmospheres shown in Table 2. (The other conditions were the same as in Example 1 (2)(A)).

The evaluation results of the films thus obtained appear in Table 2.

TABLE 2

| Symbol of the film | Mix ratio of Supplied gas N$_2$:CO$_2$ (volume ratio) | Printability | Metallizability | Critical surface wetting tension (dyne/cm) | μ met |
| --- | --- | --- | --- | --- | --- |
| A-2 | 99.2:0.8 | 5 | 5 | 56 | 0.70 |
| A-3 | 97:3 | 5 | 5 | 68 | 0.52 |
| A-4 | 80:20 | 5 | 5 | 72 | 0.51 |
| A-5 | 55:45 | 4 ~ 5 | 5 | 72 | 0.52 |

EXAMPLE 3

(1) The film: the same polypropylene film as in Example 1 was used.

(2) Surface treatment

Treatments of this invention were carried out in atmospheres with oxygen contents as shown in Table 3. (The other conditions were the same as in Example 1(2)(A)).

As a reference, a similar treatment in a higher oxygen-containing atmosphere was carried out.

The evaluation results of the films thus obtained are shown in Table 3.

TABLE 3

| Symbol of the film | Remaining oxygen content (vol %) | Printability (1)[a] | Printability (2)[b] | Remarks |
| --- | --- | --- | --- | --- |
| A-6 | 0.005 | 5 | 5 | Process of this invention |
| A-7 | 0.02 | 5 | 5 | Process of this invention |
| A-8 | 0.05 | 5 | 5 | Process of this invention |
| A-9 | 0.10 | 5 | 4 ~ 5 | Process of this invention |
| D-1 | 0.30 | 3 | 1 | Reference |

[a]Evaluated immediately after treatment
[b]Evaluated after 6 months' aging

EXAMPLE 4

(1) Films: five kinds of films, hereinafter described, were prepared:

(a) Biaxially stretched polyester (polyethylene terephthalate) film (12 μm thick) ("Lumirror" P11, manufactured by Toray Ind. Inc.).

(b) Biaxially stretched "Nylon" film (20 μm thick) ("Emblem", manufactured by Unichica Ind. Co.)

(c) Non-stretched ethylene-propylene copolymer film (25 μm thick) ("Torayfan" NO, manufactured by Toray Ind. Inc.)

(d) Biaxially stretched polypropylene film coated with polyvinylidene chloride (25 μm thick) ("Torayfan" G145, manufactured by Toray Ind. Inc.)

(e) Non-stretched polyethylene film (30 μm thick) (Formed by the T-die method from "Sumikasen" L705 pellets, manufactured by Sumitomo Chemical Co.)

(2) Surface treatment.

The films thus obtained were respectively subjected to the treatment of this invention in the same manner as in Example 1(2) (A)).

The evaluation results of the films thus obtained are shown in Table 4.

TABLE 4

| Symbol of the film | Film | Printability | Critical surface wetting tension (dyne/cm) | μ met |
|---|---|---|---|---|
| a | Polyester film | 5 | 75 | 0.49 |
| b | "Nylon" film | 5 | 72 | 0.52 |
| c | Ethylene-propylene copolymer film | 5 | 70 | 0.51 |
| d | Polyvinylidene chloride coated film[a] | 5 | 86 or more | 0.54 |
| e | Polyethylene film | 5 | 73 | 0.55 |

[a]The coated side was treated.

Although this invention has been described with reference to several specific embodiments thereof, it will be appreciated that many variations may be resorted to, including the substitution of equivalent procedures, materials and method steps, without departing from the spirit and scope of the invention as defined in the appended claims.

The following is claimed:

1. In a process for treating the surface of a plastic material, the step which comprises subjecting the surface of the material to corona discharge in contact with a mixed gas which substantially consists of nitrogen and carbon dioxide, the volume of nitrogen to carbon dioxide in said mixed gas being in the range of 99.5:0.5 to 50:50.

2. The process of claim 1, wherein the volume ratio of nitrogen to carbon dioxide in the mixed gas is in the range of 99.2:0.8 to 80:20.

3. The process of claim 1, wherein the oxygen content in said mixed gas is less than 0.1 vol %.

4. The process of claim 1, wherein the oxygen content in said mixed gas is less than 0.05 vol %.

5. The process of claim 1, wherein the volume ratio of nitrogen to carbon dioxide in the mixed gas is in the range of 99.5:0.5 to 50:50, and wherein the oxygen content in said mixed gas is less than 0.1 vol %.

6. The process of claim 1, wherein the plastic material is a film.

7. The process of claim 6, wherein said film comprises at least one member selected from the group consisting of polyethylene, polypropylene, polyester, polyvinylchloride, polyvinylidene chloride, polyamide, polyimide and fluoroplastic.

8. In a process for treating the surface of a plastic film by corona discharge treatment while continuously running said film at high speed over an electrically grounded metal which tends to develop an electrical charge on said film thereby increasing the frictional drag between said film and said metal, the steps which comprise:

(a) surrounding said film and said metal with an atmosphere consisting essentially of nitrogen and carbon dioxide, the volume ratio of nitrogen to carbon dioxide in said atmosphere being in the range of about 99.5:0.5 to about 50.0:50.0, (b) running said film at high speed over said ground metal, (c) applying high voltage across a gap to create a corona discharge adjacent said running film, and (d) while running said film, substantially completely excluding oxygen from said gap to maintain the oxygen concentration at a value less than 0.1 vol %.

* * * * *

UNITED STATES PATENT AND TRADEMARK OFFICE
CERTIFICATE OF CORRECTION

PATENT NO. : 4,297,187

DATED : October 27, 1981

INVENTOR(S) : Yukichi Deguchi et al

It is certified that error appears in the above—identified patent and that said Letters Patent is hereby corrected as shown below:

Column 2, line 47: "100 mg Hg" should read -- 100 mm Hg --.

Signed and Sealed this

Ninth Day of February 1982

[SEAL]

Attest:

GERALD J. MOSSINGHOFF

Attesting Officer　　Commissioner of Patents and Trademarks